United States Patent
Deleam et al.

(10) Patent No.: US 7,313,149 B2
(45) Date of Patent: Dec. 25, 2007

(54) METHOD OF PROCESSING DATA PACKETS RECEIVED ON ASYNCHRONOUS NETWORKS, AND DEVICE FOR IMPLEMENTING THE METHOD

(75) Inventors: David Deleam, Perros Guirec (FR); Franck Bouteille, Trebeurden (FR)

(73) Assignee: France Telecom, Paris (FR)

( * ) Notice: Subject to any disclaimer, the term of this patent is extended or adjusted under 35 U.S.C. 154(b) by 974 days.

(21) Appl. No.: 10/702,019

(22) Filed: Nov. 5, 2003

(65) Prior Publication Data

US 2004/0146060 A1    Jul. 29, 2004

(30) Foreign Application Priority Data

Dec. 3, 2002    (FR) .................................. 02 15207

(51) Int. Cl.
*H04L 12/56* (2006.01)
(52) U.S. Cl. ................. 370/429; 370/337; 370/412
(58) Field of Classification Search ............. 370/336, 370/337, 235, 347, 442, 412, 419, 428, 429
See application file for complete search history.

(56) References Cited

U.S. PATENT DOCUMENTS 5,812,528 A * 9/1998 VanDervort ............... 370/235
6,252,850 B1 * 6/2001 Lauret ....................... 370/235

OTHER PUBLICATIONS

Rozenshine-Kemelmacher, "ATM Traffic Analysis: Burst Scale Probability Function," *ITC-CSC 2002 Proceedings*, pp. 1-4 (Jul. 16-19, 2002).

* cited by examiner

*Primary Examiner*—John Pezzlo
(74) *Attorney, Agent, or Firm*—Drinker Biddle & Reath LLP

(57) ABSTRACT

The digital data packets received contain data describing successive time segments of a signal stream to be restored, for example audio. Elements obtained from the packets received are recorded in a buffer memory organized in first-in first-out mode. A burst of packets fulfilling a certain burst size condition is detected a priori, on the basis of a reception delay evaluated in response to the reception of a first packet of the burst. The content of the buffer memory is controlled by accounting for the detection of the burst fulfilling the size condition.

32 Claims, 11 Drawing Sheets

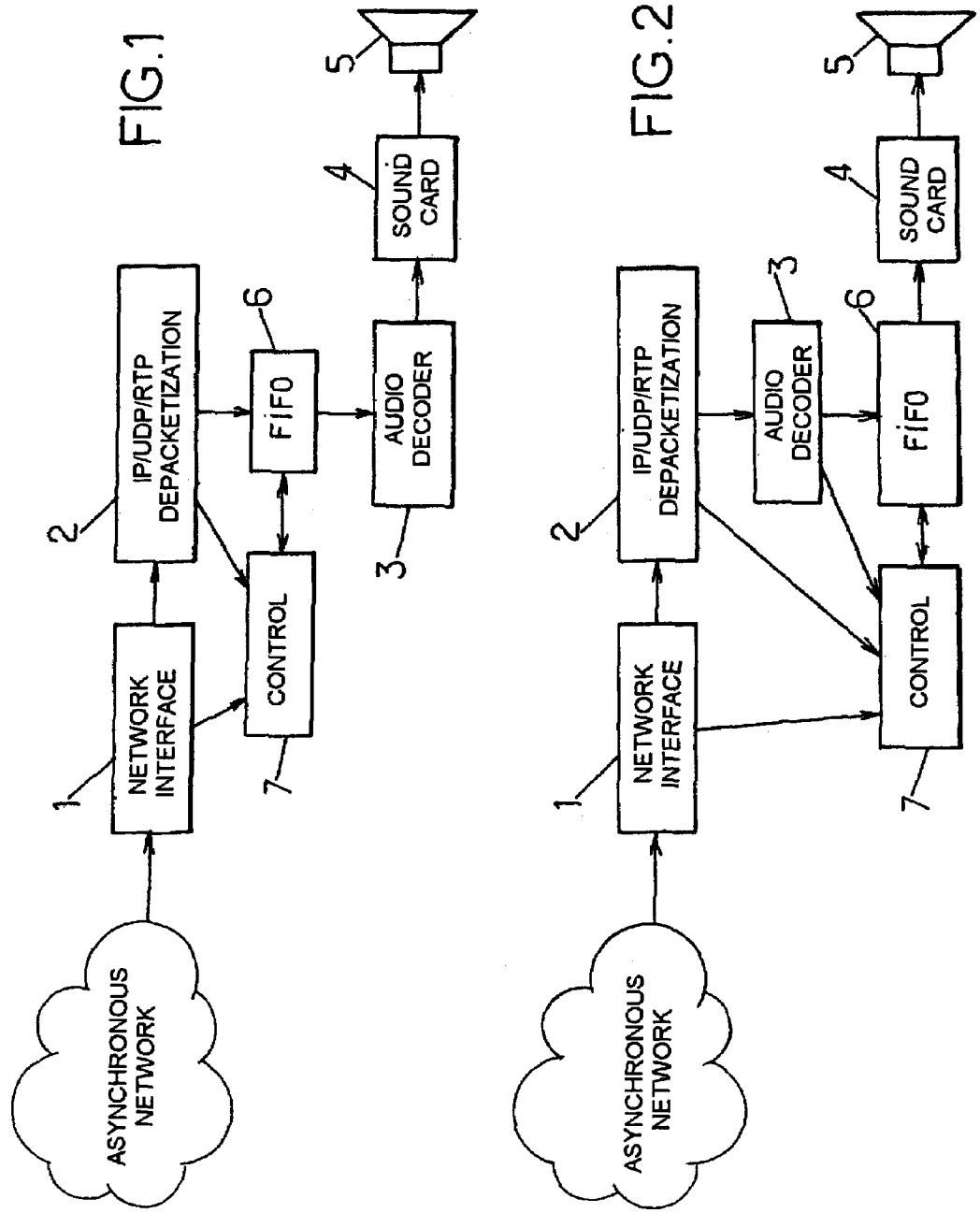

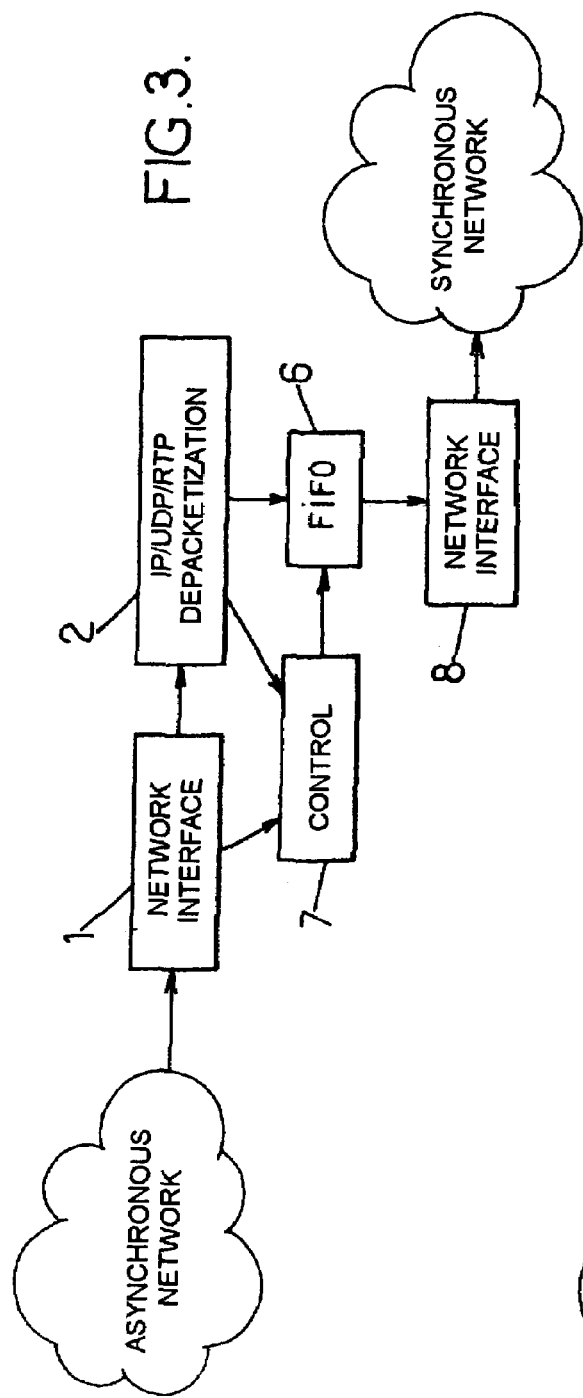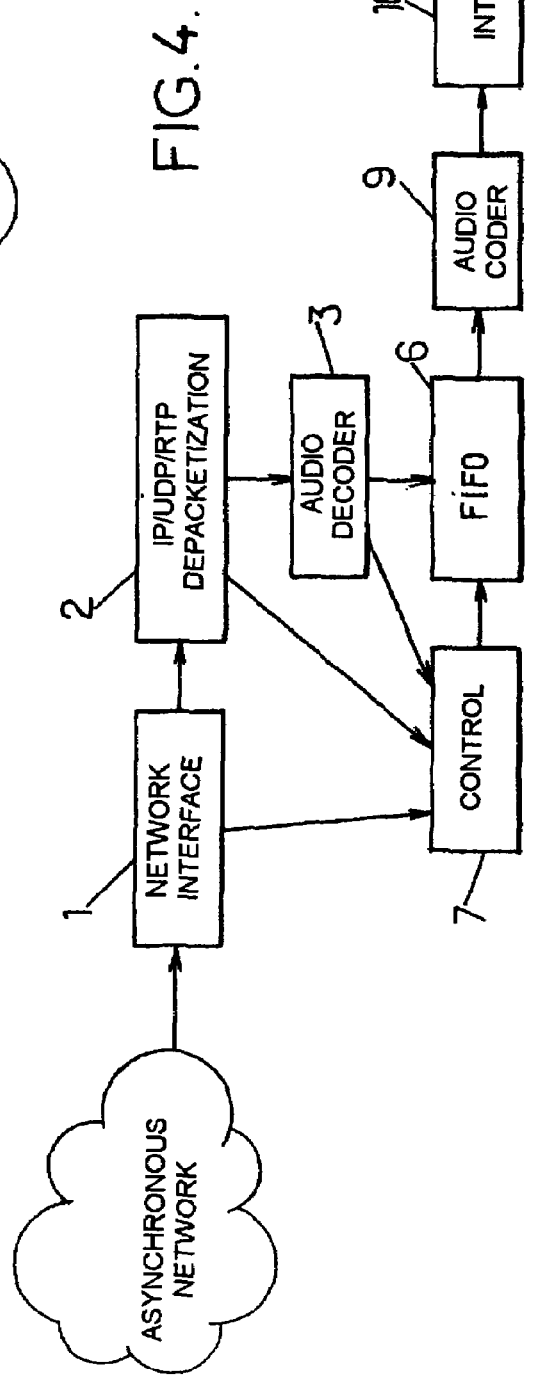

METHOD OF PROCESSING DATA PACKETS RECEIVED ON ASYNCHRONOUS NETWORKS, AND DEVICE FOR IMPLEMENTING THE METHOD

BACKGROUND OF THE INVENTION

The present invention relates to techniques for processing time constrained signals received via asynchronous links.

It relates more particularly to a mechanism that can be implemented in the case of asynchronous transmission with high temporal jitter, for example in the case of communications over networks operating according to the Internet protocol (IP). This mechanism is embedded into terminals, bridges, gateways, and more generally into any element of the network capable of intervening on the data transported.

More specifically, the invention applies particularly in any equipment receiving streams (audio, video and/or data) consisting of packets sent regularly and furnished with a memory organized in first-in first out mode (FIFO) so as to account for the network jitter phenomenon. This is the case in particular in respect of terminals supporting voice over IP (VOIP), which all incorporate a FIFO-managed buffer memory to absorb in particular the network jitter and which interexchange audio data streams regularly through IP packets transported by means of the UDP protocol ("User Datagram Protocol"). For example, two terminals communicating by means of the G.723.1 speech coder as standardized by the International Telecommunications Union (ITU-T) conventionally exchange 24 bytes of audio data every 30 milliseconds.

The invention supplements or adapts the already used conventional mechanisms for FIFO management.

The invention is particularly aimed at interactive applications of voice communication type for example, but may also be of benefit in less interactive applications such as in particular reading in transit ("streaming").

In any packet mode asynchronous communication, the network introduces a fixed delay as well as a variable delay called "network jitter". The reception of the packets that pass through the network is delayed with respect to their instant of transmission. The fixed delay, if it remains small, is not the most constraining. Its effect is essentially felt as posing a problem of interactivity in the communication. Network jitter is more of a nuisance since it gives rise on the one hand to voids (lack of signal to be restored, the packet arriving too late) and on the other hand, at other moments, to an overabundance of packets to be restored (simultaneous arrival of several consecutive packets forming a burst), this possibly introducing a further delay that is detrimental to the interactivity of the communication, for example in the case of VOIP.

A mechanism whereby these variations in transmission delay can be managed to a certain extent must therefore be introduced on reception. This mechanism is to be placed at the receiver end and not at the transmitter, since the latter transmits packets periodically, the variations being introduced by the asynchronous network. As this network cannot be controlled either by the transmitter or by the receiver, it is necessary to accommodate its nondeterministic and non-predictable behavior.

The mechanism generally used to control the jitter phenomenon is the implementation of a FIFO that makes it possible to compensate for the delays of the packets received at the restoring system.

The packets may possibly be received in a different order from that in which they were transmitted. This phenomenon, called "desequencing", is due to the fact that the packets sent travel independently over the IP networks. Nevertheless, this is a relatively rare phenomenon on the Internet (probability of the order of 0.01%). The real-time protocols employed make it possible, by virtue of a sequence number allocated to each packet, to put them back into the right order on reception, or else to destroy the desequenced packets if their instant of restoration has past. Such is the case in particular with the RTP protocol ("Real Time Protocol") described in RFC ("Request for Comments") 1889 and 1890 published in January 1996 by the IETF ("Internet Engineering Task Force").

The aforesaid FIFO may be located at various places within the reception chain.

FIGS. 1 and 2 show a VOIP-type receiver comprising a network interface 1, customarily consisting of a modem or a network card, linked to a module 2 implementing the IP, UDP and RTP protocols for receiving IP packets and extracting their content ("depacketization" operation). This content is fed to a speech decoder 3 corresponding to the coder (G.723.1 or the like) used by the transmitter and effecting the digital decompression of the audio signal. The speech is ultimately restored by means of a sound card 4 provided with a restore buffer and with a loudspeaker 5.

In the configuration illustrated by FIG. 1, the FIFO 6 is situated between the depacketization module 2 and the decoder 3. In the configuration illustrated by FIG. 2, it is situated between the decoder 3 and the sound card 4. This FIFO 6 is associated with a control module 7 which implements the network jitter compensation algorithms.

FIGS. 3 and 4 illustrate other possible environments of the jitter FIFO 6, other than in a receiver restoring the speech transmitted. In practice, the possible configurations are very numerous.

The diagram of FIG. 3 does not comprise an audio decoder. It corresponds for example to a gateway placed between the IP-type asynchronous network and a synchronous network. The information stream read from the FIFO 6 is provided to the network interface 8 which shapes it for transmission over the synchronous network.

The exemplary item of equipment represented in FIG. 4 ensures a transcoding function, for example between a G.723.1 compression on the asynchronous network and a higher bit rate coding such as G.711 on a local area network (LAN). The jitter FIFO 6 can be placed after the G.723.1 type decoder 3, as represented, or before the latter. The decoded audio stream read from the FIFO 6 is recoded by the G.711-type coder 9 and then provided to the LAN interface circuit 10.

The position of the FIFO can have an influence on the management of the latter. Specifically, in the case of VOIP for example, when the FIFO is placed before the decoder (FIG. 1 or 3), the algorithm cannot access the signal itself since it then only has a coded version of the parameters characterizing the signal. When the FIFO is placed after the decoder (FIG. 2 or 4), it is then possible to adapt the management of the FIFO to the decoded signal that it contains.

One of the first jitter management techniques which was proposed consists in the use of a fixed threshold: when the FIFO is full and a packet arrives, the latter cannot be incorporated into the FIFO, thereby causing its destruction. It is then the size of the FIFO which imposes the maximum delay that it can absorb. It is also this size which makes it possible to define the interactivity/loss compromise.

The network jitter can take relatively high values (for example 300 ms). If the FIFO is dimensioned to be able to absorb a smaller maximum jitter, then when the jitter of a packet exceeds this limit, the restoring system detects an absence of packet, and must alleviate the lack of signal by generating a replacement signal chunk corresponding to a packet (for simplicity of expression, it will be said to generate a replacement or substitution packet for the missing packet, even if the precise mechanism used does not generally comprise the actual production of a packet). This absence of packet is therefore managed in the same way as a loss of the packet from the network. The duration of the signal stored in the FIFO is thus an important parameter in respect of interactivity and quality of communication. Too large a FIFO reduces interactivity but preserves quality, too small a FIFO improves interactivity but may degrade quality by entailing the too frequent generation of replacement packets.

When the FIFO is full, another possibility is to retain the new packets but to destroy the older packets already present in the FIFO. This scheme for emptying the FIFO impairs the quality of the signal in an equivalent manner. However, this fairly blunt scheme is commonly used in practice, so as to favor the thread of the communication by updating the FIFO with the most recent data. The emptying may be total or partial. In the latter case, the joint use of a VAD technique (Voice Activity Detection) allows judicious deletion of the signal frames comprising only background noise. Likewise, in certain embodiments, the FIFO emptying decision can be taken before it is full.

Whichever techniques, more or less complex, are adopted to manage the jitter FIFO, the latter has a finite size and is exposed to the following problem.

It has been noted that on networks with non-guaranteed quality of service having relatively large jitter, e.g. the Internet, bursts of packets were frequent and sometimes of very considerable size. In the case considered of the regular transmission of packets, when a packet is held in a router of the IP network for a time greater than the transmission period, a certain number of packets may accumulate in this same router and be released almost instantaneously together with the oldest packet. The bigger the holding time in the router, the bigger the size of the burst will be. This size may then be greater than the finite size of the FIFO and hence give rise to saturation of the latter.

This saturation phenomenon is managed by the aforesaid FIFO management mechanisms, either by no longer allowing the FIFO to be written to when it is full, or by performing a partial or global emptying of the FIFO so as to be able to continue to write thereto.

In the first case, the FIFO is full at the end of the burst, and therefore introduces a maximum delay into the communication.

In the second case, it has been possible to delete a significant quantity of signal, and the filling degree of the FIFO is in a state dependent on the size of the burst and that of the FIFO. Specifically, let us take the example of a burst of size just less than twice the size of the FIFO. Immediately upon receipt of the first part of this burst in the FIFO, an emptying of the latter is performed, and therefore the second part is placed wholly in the FIFO. One is then in a state much like the first case, with a maximum delay in the communication. If on the contrary the size of the burst had been equal to or slightly greater than the size of the FIFO, the latter would have undergone emptying around the end of reception of this burst and would then be empty, i.e. in a state where the least delay for the next packet gives rise to a problem. Specifically, this small delay then requires the generation of a replacement packet, with a resulting impairment of quality, although valid packets have just been deleted.

In all cases, the appearance of bursts of excessive size gives rise to a degradation in the quality of the communication. In certain cases, it is accompanied by a hefty increase in the delay in the communication, and therefore a hefty degradation of the interactivity of the latter, this state possibly being longer or shorter depending on the jitter FIFO management mechanisms set in place and the type of transmission.

The known mechanisms for managing this jitter FIFO do not comprise particular procedures for managing such bursts of excessive size. They merely manage saturations of the FIFO, by occasionally providing for states of transition to this saturation, in an a posteriori examination of its degree of fill.

An object of the present invention is to limit the inevitable degradation in quality due to the network jitter phenomenon, and in particular to temporally limit the impact of the strong disturbances caused by the network.

SUMMARY OF THE INVENTION

The invention thus proposes a method of processing digital data packets received, containing description data for successive time segments of a signal stream to be restored, wherein elements obtained from the packets received are recorded in a buffer memory, and elements recorded in the buffer memory are delivered in first-in first out mode. According to the invention, a burst of packets fulfilling a burst size condition is detected a priori on the basis of a reception delay evaluated in response to the reception of a first packet of the burst, and the content of the buffer memory is controlled by accounting for the detection of the burst fulfilling said size condition.

A signal "segment" may be understood here as corresponding to a time interval of a temporally continuous signal such as an audio or video signal (it may for example consist of one or more consecutive frames of a speech coder, of a moving image coder, etc.). The signal "segment" may also be understood as corresponding to data produced regularly by a data source (for example samples of periodically taken measurements, images, etc.). In either case, these segments are generally produced regularly or quasi-regularly by a remote transmitter.

The method applies a specific processing to the bursts of excessive size, or "excessive bursts", based on their detection. One may in particular aim, after this specific processing, at a state regarded as ideal of the FIFO type buffer memory, i.e. a state ensuring the desired compromise between interactivity and loss, expressed by a target value $S_{FIFO}$ for the fill of the FIFO at the end of the burst. This makes it possible not to prolong the effect of the strong momentary disturbance caused by the network.

The detection of an excessive burst is done with the aid of a burst size estimation, resulting from the reception delay of its first packet, to determine whether the burst currently arriving may or may not be regarded as normal. A normal burst (not fulfilling the size condition) will then be processed normally in the FIFO.

The size condition may be expressed by a threshold to be defined by the user or the environment of the method. This threshold, fixed or adaptive, is bounded by a value corresponding to the size of the FIFO. It may possibly have lower values as a function of the application and of the support network. For example, a single VOIP application will be able to use a smaller threshold within the context of a transmission over a private network than within the context of a transmission over a network with jitter and stronger disturbances such as the Internet. This threshold may possibly be adapted dynamically as a function of the behavior of the network. Nevertheless, it will generally be fairly high, since the classing of a burst as an excessive burst should correspond to a strong and occasional disturbance of the network. Ordinary or normal disturbances should, on the other hand, be managed by the normal for jitter FIFO control mechanisms, in particular through the choice of a suitable FIFO size.

So as not to have to deal with the problem a posteriori, the estimation of the burst size takes place immediately upon the arrival of the first packet of the burst. This allows immediate triggering of the appropriate processing of the burst. In the case where packets have to be deleted, the deletion can take place before these packets are placed in the FIFO, and this avoids disturbing it.

In the ordinary case of IP communications, a number of information elements make it possible to estimate the size of a burst, in particular information obtained via the RTP protocol, namely the sequence number and/or the timestamp.

Upon the arrival of bursts of considerable size, the packets preserved introduce a degree of fill of the FIFO which may propagate for a certain number of clock cycles and reduce its efficiency in respect of relatively weak jitter phenomena. The invention, by being based on detection of these bursts of considerable size, solves this problem with the aid of various techniques of actions and of deletions of packets that make up the excessive burst. These deletions may depend on the FIFO position (for example before or after the speech decoder).

The implementation of these techniques of total or partial deletion is straightforward when the FIFO is placed before the decoder. The value of $S_{FIFO}$ must simply be chosen in a relevant manner so as on the one hand to preserve a sufficient number of packets, and on the other hand not to introduce saturation of the FIFO, which would lengthen the effect of a burst on the quality of the signal restored. However, the packets are deleted without having a priori knowledge of their content.

The system design may provide for a relationship between the FIFO and the restoring system so as to envisage deletions of packets as a function of their content. Occasionally, one would possibly be contented with partial reading of the packet (with partial decoding, e.g. to obtain the audio gain of the signal, voicing information, etc.) in order to judicially select packets to be deleted. A positioning of the FIFO after the speech decoder simplifies the deletion of packets as a function of their content.

BRIEF DESCRIPTION THE DRAWINGS

FIGS. 1 to 4 are schematic diagrams of equipment where the invention finds application.

DESCRIPTION OF PREFERRED EMBODIMENTS

Figure 5:
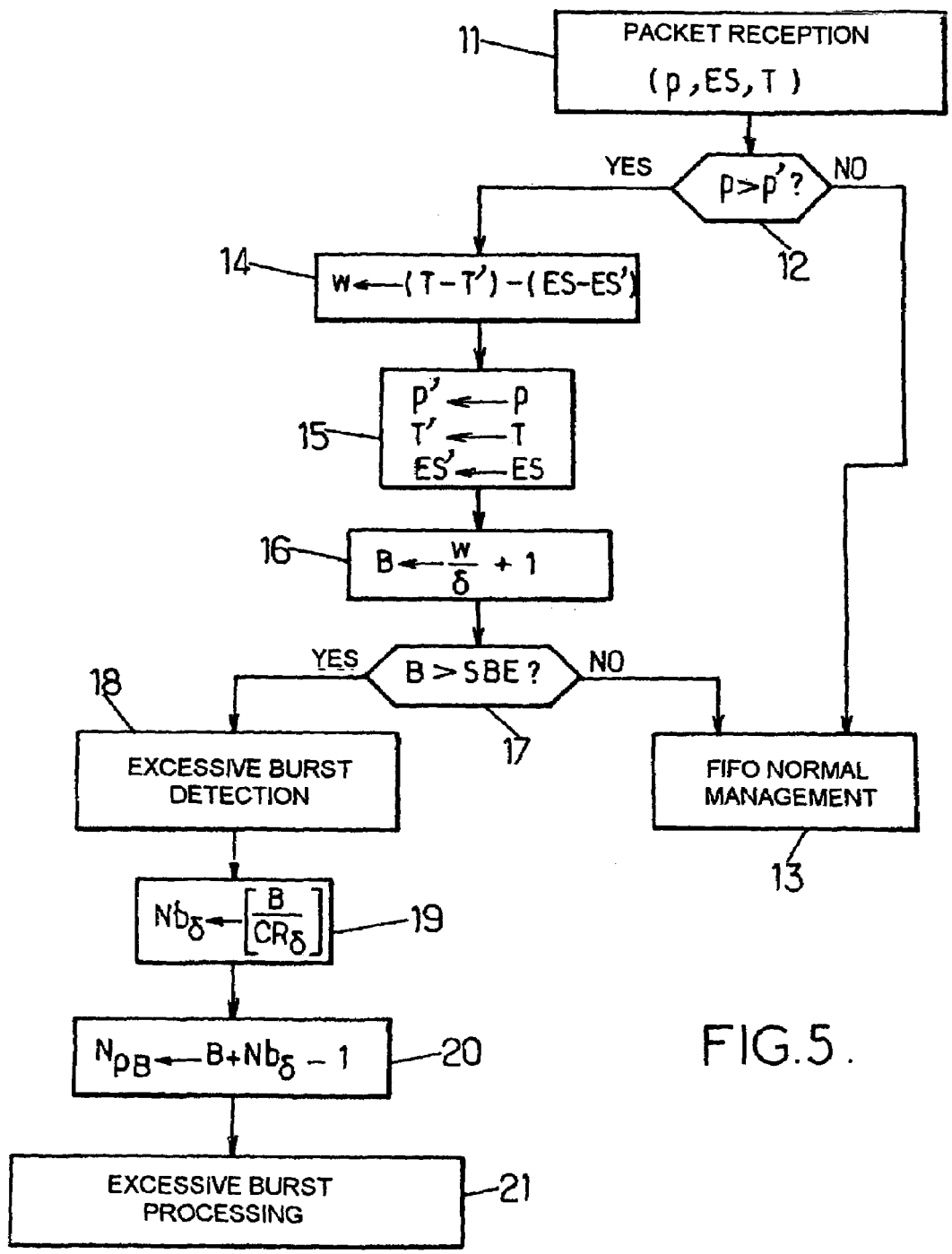
FIG. 5 is a flowchart illustrating an implementation of the detection and of the evaluation of excessive bursts according to the invention.

The invention is described hereinbelow in its non-limiting application to voice over IP (VOIP) transmission using the RTP protocol at the ends to manage the temporal aspects of the transmission over the asynchronous network. It will be appreciated that the principles described are transposable to other applications of transmission over asynchronous networks. The method hereinbelow can be implemented in any one of the configurations illustrated by FIGS. 1 to 4, or in any other appropriate configuration.

We denote by $\delta$ the transmission period of the IP/UDP/RTP packets by the transmitter and by $CR\theta$ the reception capacity on the network, i.e. the number of packets that the receiver can receive over a duration $\theta$. The duration $\theta$ considered here for the management of the jitter FIFO corresponds to the period $\delta$, to simplify the exposition of the invention, the network reception capacity therefore being expressed by $CR_\delta$. However, it will be appreciated that this management may also be based on the duration L of the basic frame of the coder/decoder (a packet possibly containing several frames), or else on a local concept of "receiver frame" corresponding to a block read from the FIFO.

In the VOIP case, the IP packets sent contain periodically transmitted audio signal frames of fixed length. For example, for a G.723.1 communication with one frame per packet, the packets each containing L=30 ms of signal are transmitted regularly, i.e. one packet every $\delta$=L=30 ms.

At the receiver level, $\delta$ being known as is the size of the packets, it is possible to estimate the delay, or jitter, $w_n$ of a packet (n) with respect to the previous one (n-1). If packet n-1 arrived at the instant $T_{n-1}$ and packet n at the instant $T_n$, this jitter $w_n$ generally equals:

$$w_n = T_n - (T_{n-1} + \delta) \quad (1)$$

If the estimated jitter $w_n$ is greater than around $2\delta$ or $3\delta$, the conventional behavior of an IP-type network means that one can expect to receive a burst.

The size B of this burst, expressed as a number of packets, may then be estimated via the formula:

$$B = \frac{w_n}{\delta} + 1 \quad (2)$$

This estimation of $w_n$ and of B corresponds to ideal conditions of regular transmission of data, and ignores:

discontinuous transmission, which gives rise to periods with no signal transmitted, in particular in the presence of VAD/DTX/CNG mechanisms ("Voice Activity Detection/Discontinuous Transmission/Comfort Noise Generation");

cases of loss of packets; and possible desequencing.

Nevertheless, these phenomena may be taken into account in estimating the size of the burst.

The VAD/DTX/CNG mechanism is based on a voice activity detection (VAD) algorithm that stops the transmission of the signal when the latter contains only noise (silence) and resumes this transmission upon a start of speech. In an ordinary implementation of this mechanism, the last frame sent before an interrupt is special: it is a so-called SID ("Silence Identifier") frame indicating the switch to silence mode. If the receiver knows that it is in silence mode, the packet n previously considered corresponds to the speech resumption packet, and hence the reception time $T_n$ is not to be related to the time $T_{n-1}$, since an undetermined time $\tau$ corresponding to the length of the noise zone separates them. Likewise, if discontinuous transmission is implemented with no SID frame, the reception time $T_n$ is not to be directly related to the time $T_{n-1}$.

When a VAD/DTX/CNG mechanism is or may be activated, the receiver has been informed thereof during the setting up of the communication, or it spontaneously takes this possibility into account. The RTP timestamp then makes it possible to ensure the detection of the size of a possible burst. Specifically, this timestamp indicates, according to a clock defined by the aforesaid RFC 1890, the sampling instant of the first sample represented by the content of the packet. Therefore, this enables us to estimate the time $\tau$. If $ES_n$ denotes the timestamp of packet n, we have:

$$\tau = ES_n - (ES_{n-1} + \delta) \qquad (3)$$

The actual jitter of packet n can then be estimated from this estimation of $\tau$:

$$w_n = T_n - (T_{n-1} + \delta) - \tau \qquad (4)$$

The packet received just after the packet of sequence number n−1, has a sequence number p that enables the receiver to know that this is indeed packet n following packet n−1 from the transmitter's point of view. Three cases may then arise:

1/p=n. This packet is the expected packet n. Its jitter is estimated as previously, via formula (1) or formula (4) if a VAD/DTX/CNG mechanism is used.

2/p<n−1. This desequenced packet is generally deleted since it is too old or, if the FIFO management so permits, put back in its place. Anyway, its time of arrival is not taken into account. One waits for the next packet so as to estimate its jitter with respect to the instant $T_{n-1}$ of arrival of packet n−1.

3/p>n. From the reception of this packet one deduces that p−n packets have been lost in the network or desequenced. The estimation of the time jitter of this packet p arriving at the instant $T_p$ is given by $w_p = T_p - (T_{n-1} + (p-n+1)\delta)$, whereby a delay $\tau$ may also be taken into account in case of VAD/DTX/CNG.

It is noted that, when the timestamp is present, the jitter $w_p$ may be estimated in the following manner, insofar as p>n−1:

$$w_p = (T_p - T_{n-1}) - (ES_p - ES_{n-1}) \qquad (5)$$

FIG. 5 is a flowchart showing an example of processing that can be applied by module 7 for controlling the jitter FIFO 6 in order to detect a possible excessive burst on receipt of an IP/UDP/RTP packet. Receipt 11 of the packet is signaled by the depacketization module 2 which notes the sequence number p and the timestamp ES that are present in this packet as well as the time of receipt T, and forwards these parameters p, ES, T to the control module 7.

The values p' (n−1), ES' ($ES_{n-1}$) and T' ($T_{n-1}$) of these three parameters that were noted on the arrival of the previous packet (apart from desequenced packets) are kept in memory by the module 7. The sequence numbers p and p' are compared in step 12. If p≦p' (case 2/hereinabove), the module 7 applies the mode of normal management of the jitter FIFO 6 (step 13), i.e. for example it orders the recording of the packet at the appropriate location of the FIFO, except in the case of undue desequencing in which case it destroys the packet.

If p>p' according to test 12, the module 7 proceeds to the estimation of the jitter $w = w_p$ in accordance with formula (5) in step 14, then updates the variables p', ES' and T' with the latest values p, ES and T in step 15. The burst size B can then be estimated in step 16 according to formula (2). The detection of excessive burst properly speaking results from test 17 where the estimated burst size B is compared with the threshold SBE. If the threshold is not reached, the normal management 13 of the FIFO is applied, i.e. for example the module 7 orders the recording of the packet at the appropriate location of the FIFO. If B>SBE in test 17, the burst is detected as being excessive (step 18) and the control module 7 enters a mode of management tailored to these excessive bursts.

In certain cases, the detection of the excessive bursts may be strengthened by the indication from the network interface 1 of the presence of several packets to be processed during the time interval $\delta$.

Depending on the size B of the burst detected as excessive, the packets of the burst can be received quasi-simultaneously, i.e. over a time span of less than $\delta$, or received over several periods 8. This reception depends on the throughput of the IP routers, and also on the reception capacity $CR_\delta$ of the network interface 1. This information is not generally known by the application. Anyway, the reception throughput of the routers cannot be used since it is not possible to know which router(s) is (are) inducing the delay.

On the other hand, the cue $CR_\delta$ relating to the reception capacity of the network interface can be estimated approximately by the application. Specifically, when a heavily delayed packet finally arrives at the destination, the receiver has available after a time $\delta$ the number Mb of packets received during this time $\delta$. To get an idea of the reception capacity $CR_\delta$ of the network interface, we can take $CR_\delta = Mb$.

Such an estimation of $CR_\delta$ is approximate. It is underrated if the number of packets B constituting the burst is less than the actual reception capacity of the network interface. This is why one seeks the maximum of the values Mb observed in the course of the communication, so as to get as close as possible to this reception capacity $CR_\delta$. The control module 7 therefore observes the number Mb of packets received during the time $\delta$ following the detection of an excessive burst, and it will take the maximum out of Mb and the previous value of $CR_\delta$ as new value of $CR_\delta$ (for the next burst).

This reception capacity cue makes it possible to determine in step 19 the number $Nb_\delta$ of periods $\delta$ required for the complete reception of the packets of the burst in progress:

$$Nb_\delta = \left\lceil \frac{B}{CR_\delta} \right\rceil \qquad (6)$$

where $\lceil x \rceil$ denotes the integer equal to or immediately greater than x.

During these $Nb_\delta$ periods, the transmitter delivers as many additional packets which, if things go normally, will be received immediately after the complete arrival of the burst. Before reception resumes a quasi-normal rhythm, the receiver will then have to manage a potentially larger number of packets $N_{PB}$ than B, evaluated in step 20 by:

$$N_{PB} = B + Nb_\delta - 1 \qquad (7)$$

Various actions are then applicable for the processing 21 of the excessive bursts.

A first possibility consists in globally destroying the B packets of the burst. This solution is relatively radical since useful signal may be contained in these B consecutive packets.

A second possibility consists in destroying the first k packets of the burst, or the last k packets. The number k<B is then chosen so that the resumption of communication is made with a minimum delay, fixed by a target value $S_{FIFO}$.

To gain flexibility, it is possible to use voice activity detection to delete only the frames containing noise signal.

This solution may make it possible to delete around 60% of the signal contained in the B packets of the burst. If this is not sufficient, other packets of the burst will be destroyed.

Another proposed solution consists in detecting the end of a word, in preserving the signal up to there and in deleting the rest. This solution makes it possible to retain a coherent information part contained in the burst.

All other combinations of destruction of these packets may be envisaged. For example, one packet out of two of the burst can be deleted. These relatively blunt solutions may prove to be useful when the computational power of the receiver does not allow the deployment of more complex algorithms for improving the management of this overabundance of frames.

The target value $S_{FIFO}$ corresponds to the number of packets that one wishes to have in the FIFO at the end of the processing of the excessive burst, i.e. when the network is expected to revert to a normal mode of operation after the strong disturbance that gave rise to the excessive burst. Like for the threshold SBE, the target value $S_{FIFO}$ may be fixed or adaptive and determined as a function of the type of application and of the behavior of the network.

One possibility is to fix it equal to the average fill of the FIFO, estimated in the phases where the network causes only normal disturbances (no excessive burst, management mode of step 13).

The general objective is to delete at least B-$S_{FIFO}$ packets of the burst detected as excessive. In the case where B>$CR_\delta$, resumption of the normal state of the network occurs right from the next period δ, and under these conditions resumption occurs properly with $S_{FIFO}$ packets in the FIFO 6.

In the case where B>$CR_\delta$, the processing of the burst will spread over $Nb_\delta$ periods during which some sound will have to be restored. Ideally, actual sound would be restored, the deletion of B-$S_{FIFO}$ packets making it possible to preserve $Nb_\delta$ packets to be played during the receipt of the burst, as well as $S_{FIFO}$ packets for ensuring the desired state of the FIFO at the end of the burst. To guarantee the restoring of actual sound, the $Nb_\delta$ packets are to be drawn from the first packets of the concurrent burst of $CR_\delta$ packets. If $Nb_\delta$>$CR_\delta$, this operation will have to be repeated as many times as necessary in the following period or periods δ so as to avoid the generation of substitution packets. However, if a deletion technique giving rise to the generation of PS substitution packets is preferred, this will amount to correspondingly increasing the perceived size of the burst. To get the criterion of $S_{FIFO}$ packets in the FIFO at the end of the burst, B-$S_{FIFO}$-PS packets will then have to be deleted from the burst.

The preferred processing 21 is that where one takes account of the properties of the signal contained in the burst. However, if access to this information is not possible or too complex, a technique which makes it possible to avoid having to generate substitution packets will be preferred.

During the deletion of the packets of the burst, it is necessary to be vigilant with regard to phenomena of discontinuous transmission, packet loss and desequencing, which will give rise to a reduction in the actual size of the burst. Since these phenomena can only be taken into account during detection on the relevant packets of the burst, this may ultimately give rise to fewer than $S_{FIFO}$ packets in the FIFO. However, the main objective of avoiding too heavy and too lasting an impact of the excessive burst will be complied with. Specifically, if for example some of the last $S_{FIFO}$ packets of the burst have been lost although the first few have already been deleted, only those packets that have not been lost from among the last $S_{FIFO}$ packets of the burst will be preserved.

One way of alleviating this is to make provision for an intermediate FIFO buffer of $S_{FIFO}$ packets upstream of the jitter FIFO, that is made to slide over the ideal zone to be ultimately preserved in the jitter FIFO as a function of the detection or otherwise of these phenomena of discontinuous transmission, loss and desequencing. In the above example, the first $S_{FIFO}$ valid packets are then placed in the intermediate buffer and the reading of the information of the packets of the burst is continued, postponing the decision regarding deletion of the packets by $S_{FIFO}$ packets. The first packet of the burst is deleted if it is noted that the ($S_{FIFO}$+1)-th packet is indeed present in the burst, and so on up to the last $S_{FIFO}$ packets of the burst.

The examples which follow disclose more precisely some of the techniques for deleting packets of excessive bursts, the general principle of which has just been described.

The technique of total deletion may be used when a burst of considerable size is received during one or more intervals of reading from the jitter FIFO 6. Total deletion signifies that $S_{FIFO}$=0. Two cases corresponding to examples 1 and 2 may arise.

In the case where $S_{FIFO}$>0 (this value $S_{FIFO}$ is defined statically or dynamically, depending on the network conditions and/or the intended application), partial deletion must be envisaged. Several techniques are possible: the first deletes the first B-$S_{FIFO}$ packets received of the burst, the second deletes the last B-$S_{FIFO}$ packets received of the burst, other techniques could preserve k1 first packets and k2=B-$S_{FIFO}$-k1 last packets, or an entirely different combination of deletion complying with the value of $S_{FIFO}$. As far as possible, very few substitution packets (or even none) should be generated in addition to those created during the interruption of reception preceding the burst, since in the presence of true signal it is preferable to use the latter, rather than a substitution signal.

EXAMPLE 1

Total Deletion, with $CR_\delta \geq B$

The case where $CR_\delta \geq B$ is generally the most probable during the use of a direct connection at the network interface 1, for example with the aid of a 10 Mbit/s Ethernet network card (IEEE 802.3).

The use of the G.723.1 coder/decoder is considered, the packets each consisting of two frames (δ=2L) and being transmitted at a periodicity of δ=6 ms. A packet then involves 48 bytes for the coding of the audio signal +40 bytes of IP/UDP/RTP header +26 bytes of IEEE 802.3 header, i.e. 912 bits. The network card is capable of receiving around $CR_\delta = \lfloor 10000000 \times 0.06/912 \rfloor = 657$ packets in 60 ms ($\lfloor x \rfloor$ denotes the integer equal to or immediately below x), i.e. a signal duration of 657×0.06=39.42 s, much greater than the delays introduced by the network. The totality of the packets of the burst will therefore be received in a single cycle of the reading clock in the FIFO. Deletion will be immediate. The packet received first after the burst may be placed in the jitter FIFO 6 by the control module 7 and the communication will continue.

EXAMPLE 2

Total Deletion, with $CR_\delta$<B

The case where $CR_\delta$<B is typically encountered when the network interface 1 comprises a modem. Most contemporary modems permit a 56 kbit/s connection, thereby limiting the choice of voice coders/decoders to relatively low bit rates. Returning to the data of the above example, a packet involves 48 bytes for the coding of the audio signal +40 bytes of IP/UDP/RTP header, i.e. 704 bits. The modem is capable of receiving around $CR_\delta = \lfloor 56000 \times 0.06/704 \rfloor = 4$ packets in 60 ms, this corresponding to $4 \times 60 = 240$ ms of audio signal. Delays greater than this duration are very commonplace on the Internet. The totality of the B packets of the burst is then received in several cycles of the read clock in the FIFO, during which the control module 7 orders the production of correction frames, since none of the packets received will be restored or written to the FIFO.

Figure 6:
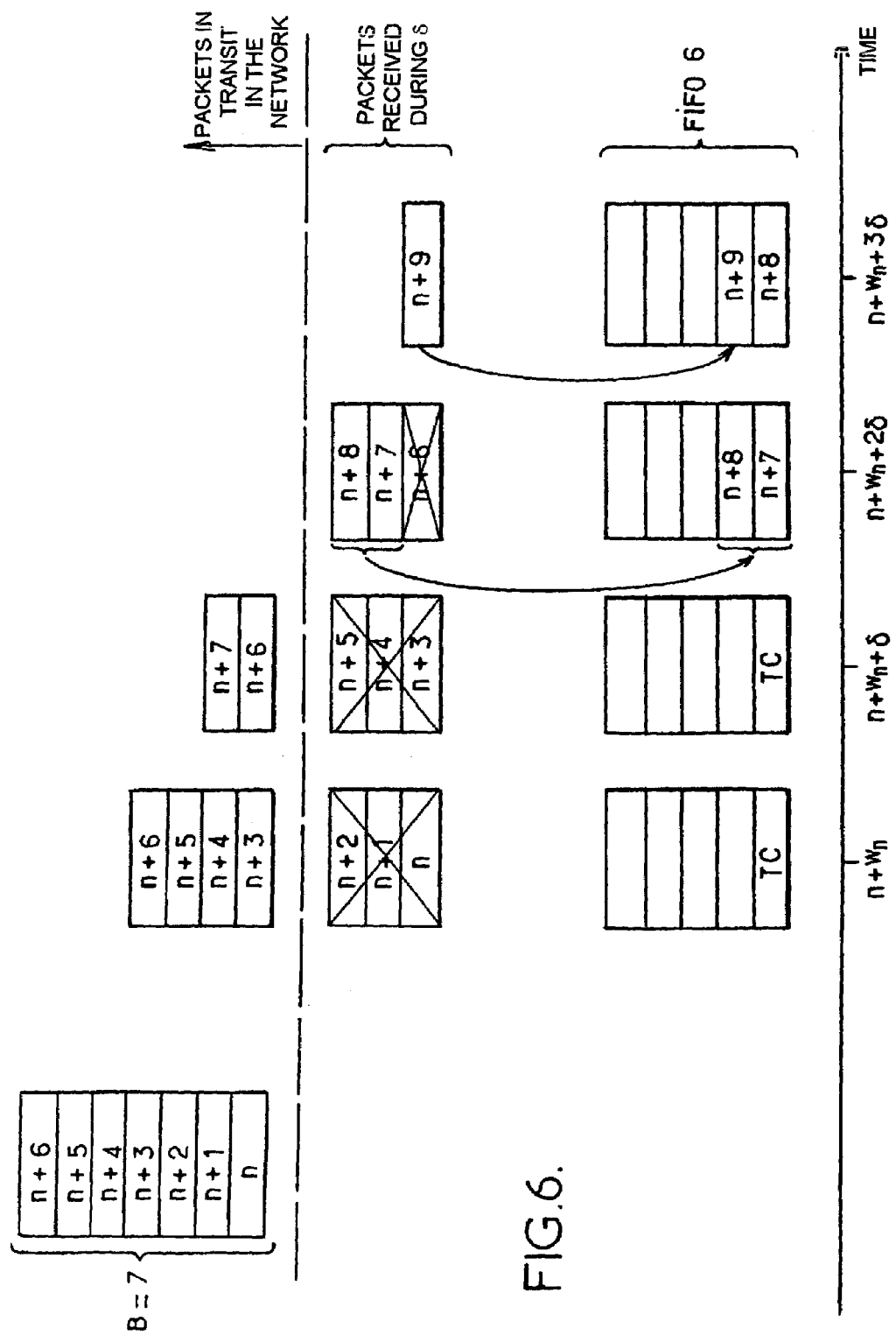
FIGS. 6 to 13 are time charts illustrating various techniques for deleting packets that can be used in accordance with the invention.

FIG. 6 illustrates this example in the case where $CR_\delta = 3$ and $B = 7$ ($Nb_\delta = 3$), with a jitter FIFO 6 of size $L_{FIFO} = 5$ in terms of number of packets. Here, as in all the examples which follow, the packets are considered to be processed as and when they are made available by the network interface of the application, at the rate of $CR_\delta$ packets per period $\delta$. The decision to ultimately place these packets in the FIFO depending on the result of the processing chosen.

The technique of total deletion involves, after the break of $B.\delta$ seconds during which the burst builds up in the network, the generation of $$N_{TC} = \left\lfloor \frac{B}{CR_\delta} \right\rfloor$$

correction frames, denoted TC in the drawing where NTC=2. This value NTC is a minimum since the conditions prevailing in the asynchronous network may again delay the arrival of the $Nb_\delta$ packets transmitted after the burst.

EXAMPLE 3

Partial Deletion of the First $B-S_{FIFO}$ Packets, with $CR_\delta \geq B$

Figure 7:
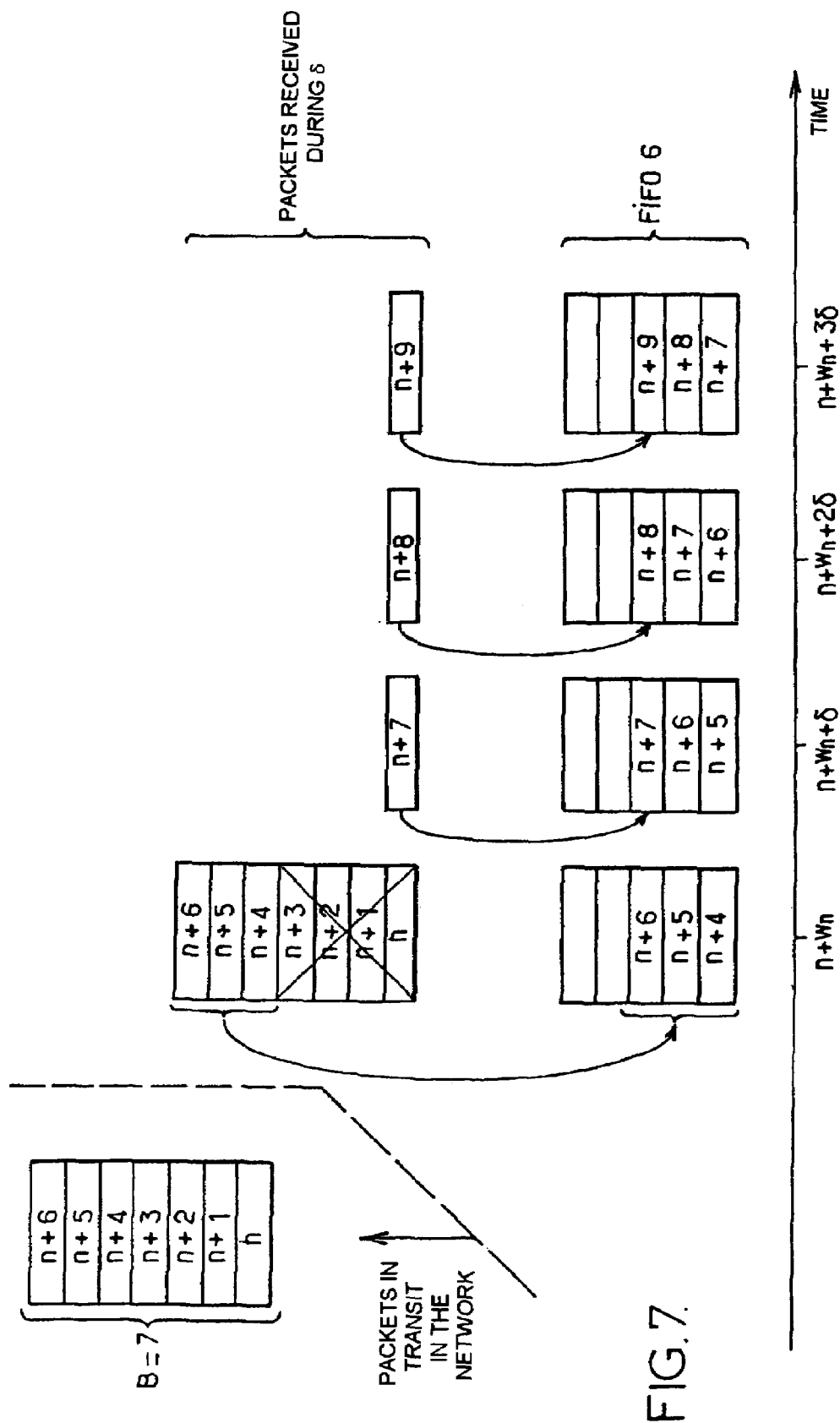

FIG. 7 illustrates this example, in a case where $B=7<CR_\delta$ and $S_{FIFO}=3$.

EXAMPLE 4

Partial Deletion of the Last $B-S_{FIFO}$ Packets, with $CR_\delta \geq B$

Figure 8:
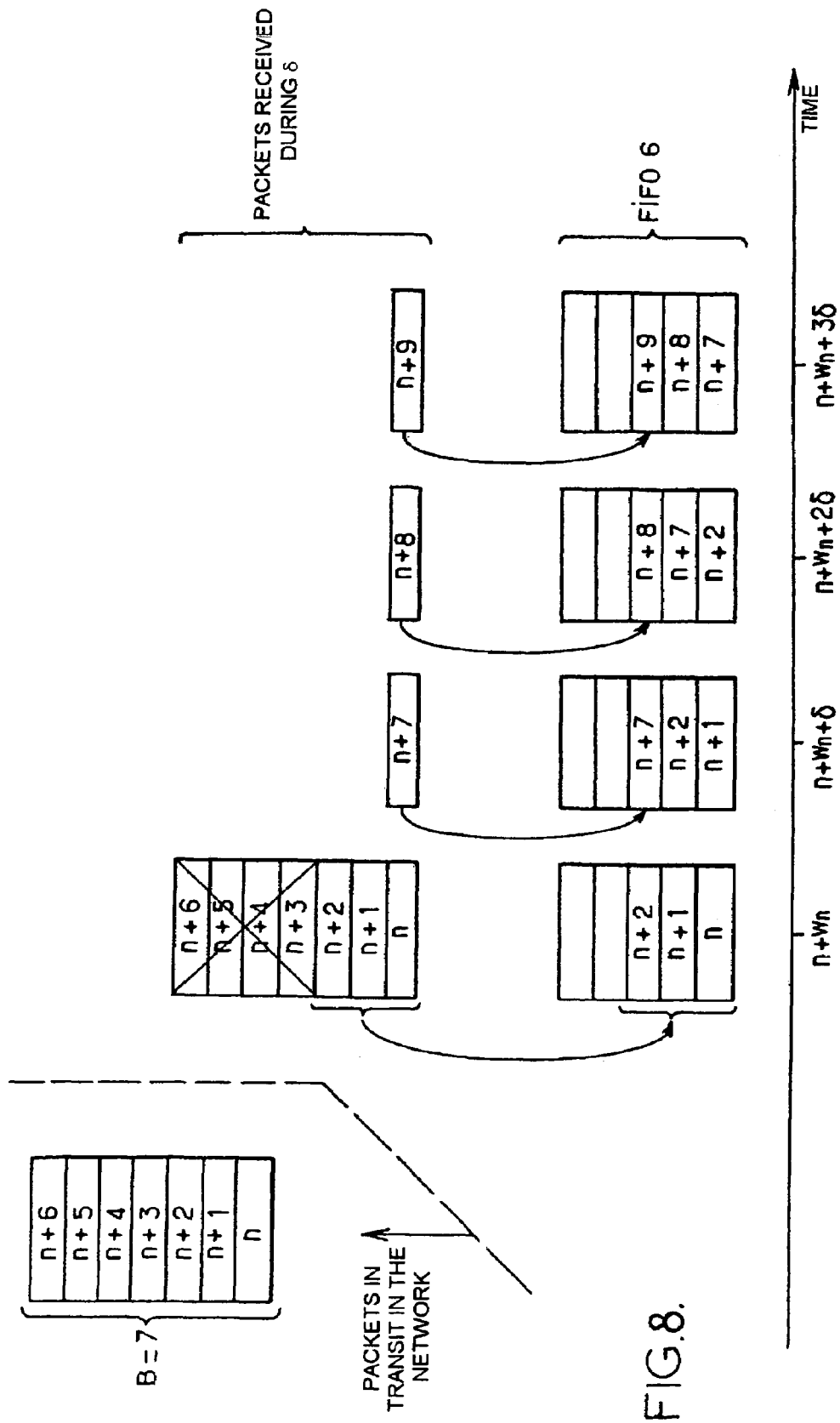

FIG. 8 illustrates this example, in a case where $B=7<CR_\delta$ and $S_{FIFO}=3$.

EXAMPLE 5

Partial Deletion of the First $B-S_{FIFO}$ Packets, with $CR_\delta<B$ and $CR_\delta<L_{FIFO}$ In the techniques of partial deletion when $CR_\delta<B$, the size of the burst seen from the receiver is increased by the number $$N_{PG} = \left\lfloor \frac{B - S_{FIFO}}{CR_\delta} \right\rfloor$$

of substitution packets generated during the arrival of the burst. The number of packets to be deleted is ultimately $B+N_{PG}-S_{FIFO}$, and the number of preserved packets of the burst is $S_{FIFO}-N_{PG}$.

The reception capacity $CR_\delta$ may either be less than or greater than the size $L_{FIFO}$ of the jitter FIFO 6.

When $CR_\delta \leq L_{FIFO}$, the packets received in the first clock cycle may be stored in the FIFO without saturating the latter, and a frame may then be restored. In the following cycles, the degree of fill of the FIFO will not allow the totality of the packets received to be preserved.

Figure 9:
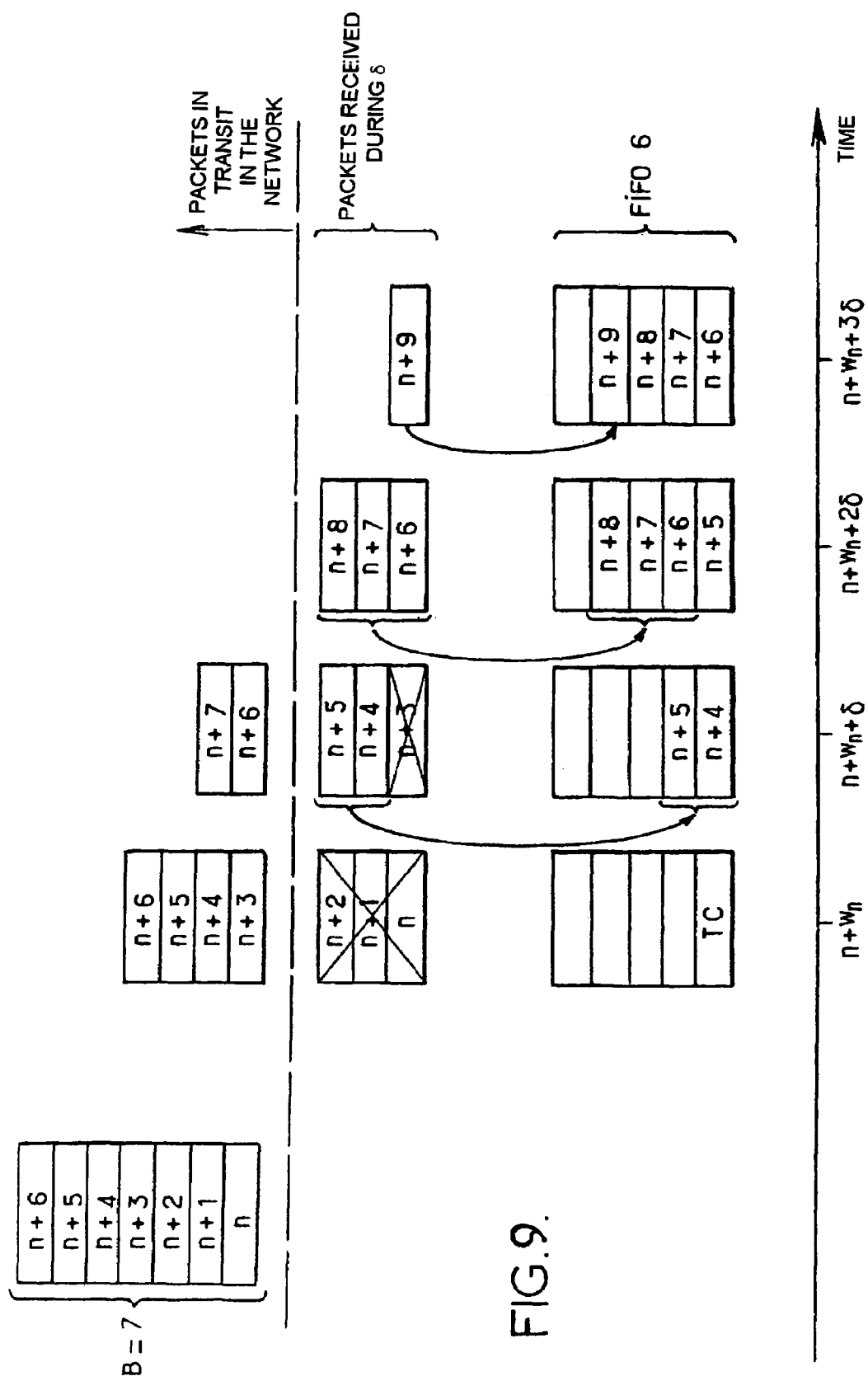

The technique of deleting the first $B-S_{FIFO}$ packets is illustrated by FIG. 9 in a case where $B=7$, $CR_\delta=3$, $S_{FIFO}=4$ and $L_{FIFO}=5$. In this example, there is generated $N_{PG}=1$ substitution packet causing the deletion of the additional packet n+3 in the second clock cycle following the detection of the burst.

EXAMPLE 6

Figure 10:
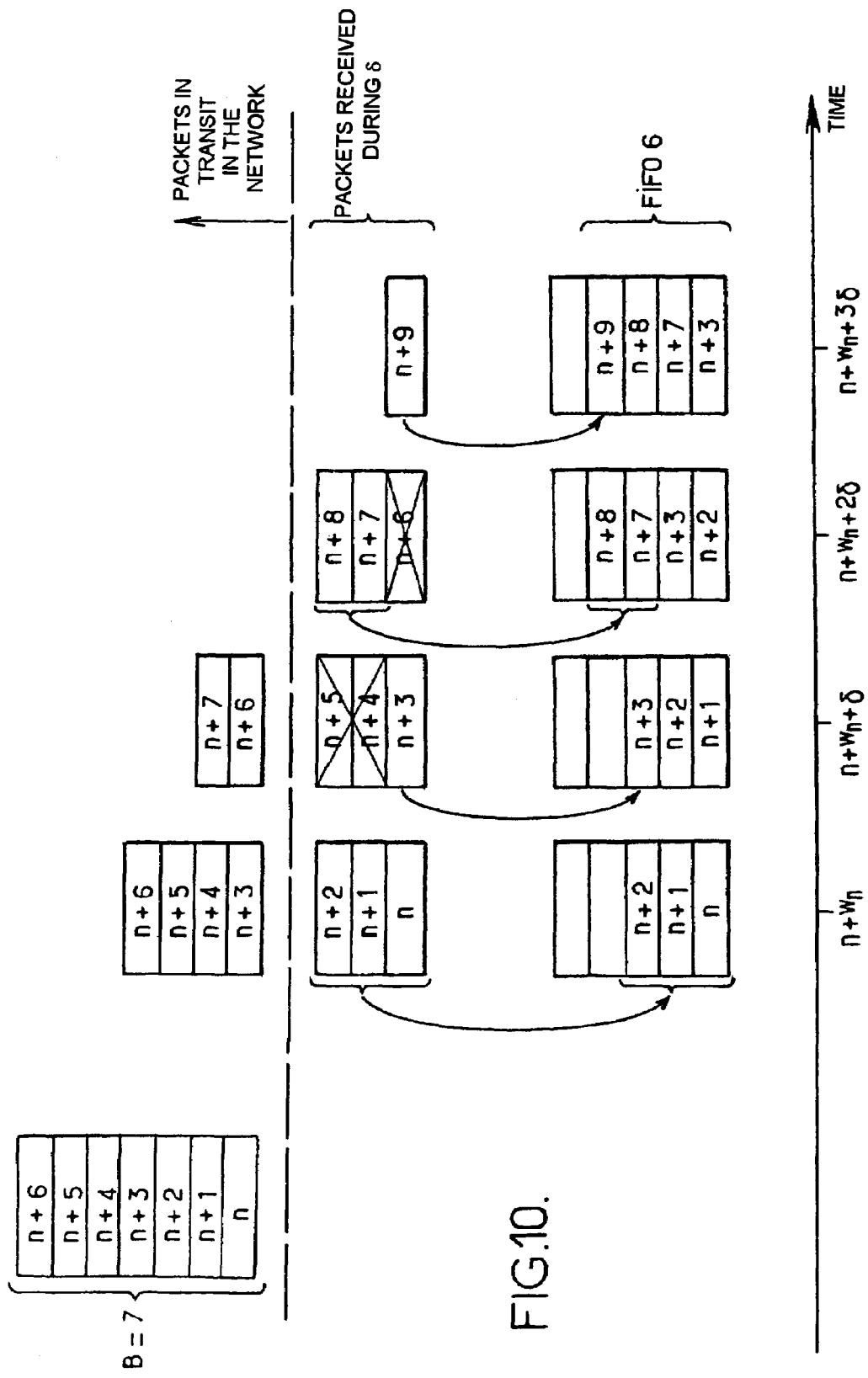

Partial Deletion of the Last $B-S_{FIFO}$ Packets, with $CR_\delta<B$ and $CR_\delta \leq L_{FIFO}$ This technique is illustrated by FIG. 10 in a case where $B=7$, $CR_\delta=3$, $S_{FIFO}=4$ and $L_{FIFO}=5$.

An insufficient value of $L_{FIFO}$ may give rise to saturation of the FIFO after the first clock cycle following the start of the burst. Certain packets belonging to the burst may then be deleted in addition to the desired $B-S_{FIFO}$ deletions. A signal break of $(B-S_{FIFO}).\delta$ seconds occurs at the end of reception of the packets of the burst.

For the interactivity of the application, it is generally preferable for the signal break to occur at the start rather than at the end of the processing of the burst (FIG. 9 rather than FIG. 10). However, deletion at the start of the burst has the drawback of causing the local production of substitution packets as soon as $B-S_{FIFO} \geq CR_\delta$ ($N_{PG} \geq 1$). An advantageous compromise can be achieved by adapting the technique of example 5 in the following manner:

when the excessive burst is detected, the control module 7 evaluates $$N_{PG} = \left\lfloor \frac{B - S_{FIFO}}{CR_\delta} \right\rfloor,$$

which represents, as a number of packets, the quantity of signal that could be missing on account of the empty state of the FIFO 6 while the burst is processed if the deleted part was placed at the start of the detected burst;

if $N_{PG}=0$, the first $B-S_{FIFO}$ packets of the burst are deleted;

if $N_{PG}=1$, one of the first $CR_\delta$ packets of the burst is preserved so as to restore in the first period $\delta$ a signal which has actually been transmitted in preference to a substitution signal. The packet preserved may in particular be the first (which amounts to keeping packet n instead of the substitution packet TC in the illustration of FIG. 9). The next $B-S_{FIFO}$ packets (n+1, n+2 and n+3 in the illustration of FIG. 9) are then deleted;

if $N_{PG}>1$, we preserve $N_{PG}$ packets out of the first $B-S_{FIFO}$ packets of the burst, including at least one of the first $CR_\delta$ packets. One possibility is to preserve the first $N_{PG}$ packets of the burst (if $N_{PG} \geq L_{FIFO}$) and to delete the next $B-S_{FIFO}$ packets. Another possibility is to preserve the first of the $CR_\delta$ packets received in the course of each of the $N_{PG}$ periods $\delta$ following the detection of the excessive burst.

This adaptation places the deleted part of the excessive burst in such a way as to prevent the FIFO 6 from being empty in the course of the processing of the burst, whilst there is a plethora of packets.

EXAMPLE 7

Partial Deletion of the First $B-S_{FIFO}$ Packets, with $L_{FIFO} < CR_\delta < B$ When $CR_\delta > L_{FIFO}$, deletion of $CR_\delta - L_{FIFO}$ packets will be necessary right from the first clock cycle following the start of the burst. In the following cycles, one packet may then be preserved out of the $CR_\delta$ new packets presented to the jitter FIFO, but with a break in the signal between this packet and the packets previously recorded in the FIFO.

Figure 11:
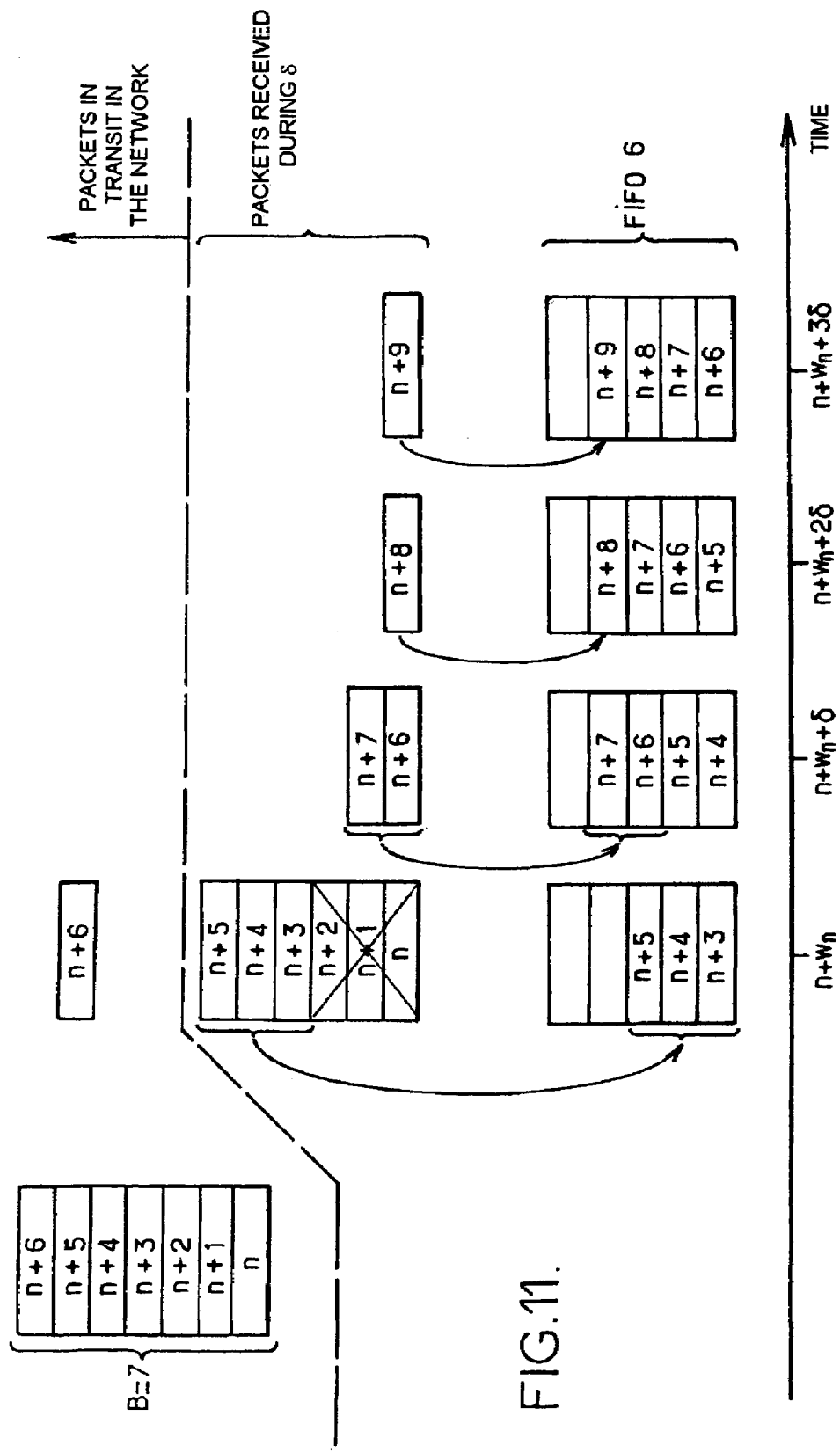

The technique of deleting the first $B-S_{FIFO}$ packets is illustrated by FIG. 11 in a case where $B=7$, $CR_\delta=6$, $S_{FIFO}=4$ and $L_{FIFO}=5$. It is seen that this technique makes it possible not to generate additional substitution packets in the case where $B-S_{FIFO} < CR_\delta$. A break in the signal of duration $(B-S_{FIFO}).\delta$ seconds occurs at the start of the burst.

During the clock cycle following the receipt of the first $CR_\delta$ packets, it is possible that packets may be deleted since the FIFO may be saturated. In the case where the substitution packet generation system is of high performance, the value of $B-S_{FIFO}$ may be greater than $CR_\delta$.

EXAMPLE 8

Partial Deletion of the Last $B-S_{FIFO}$ packets, with $L_{FIFO} < CR_\delta < B$ The number $B-S_{FIFO}$ of packets to be deleted may be chosen more easily here, and so as to not to have to generate substitution packets in the clock cycle(s) following the start of receipt of the burst.

Figure 12:
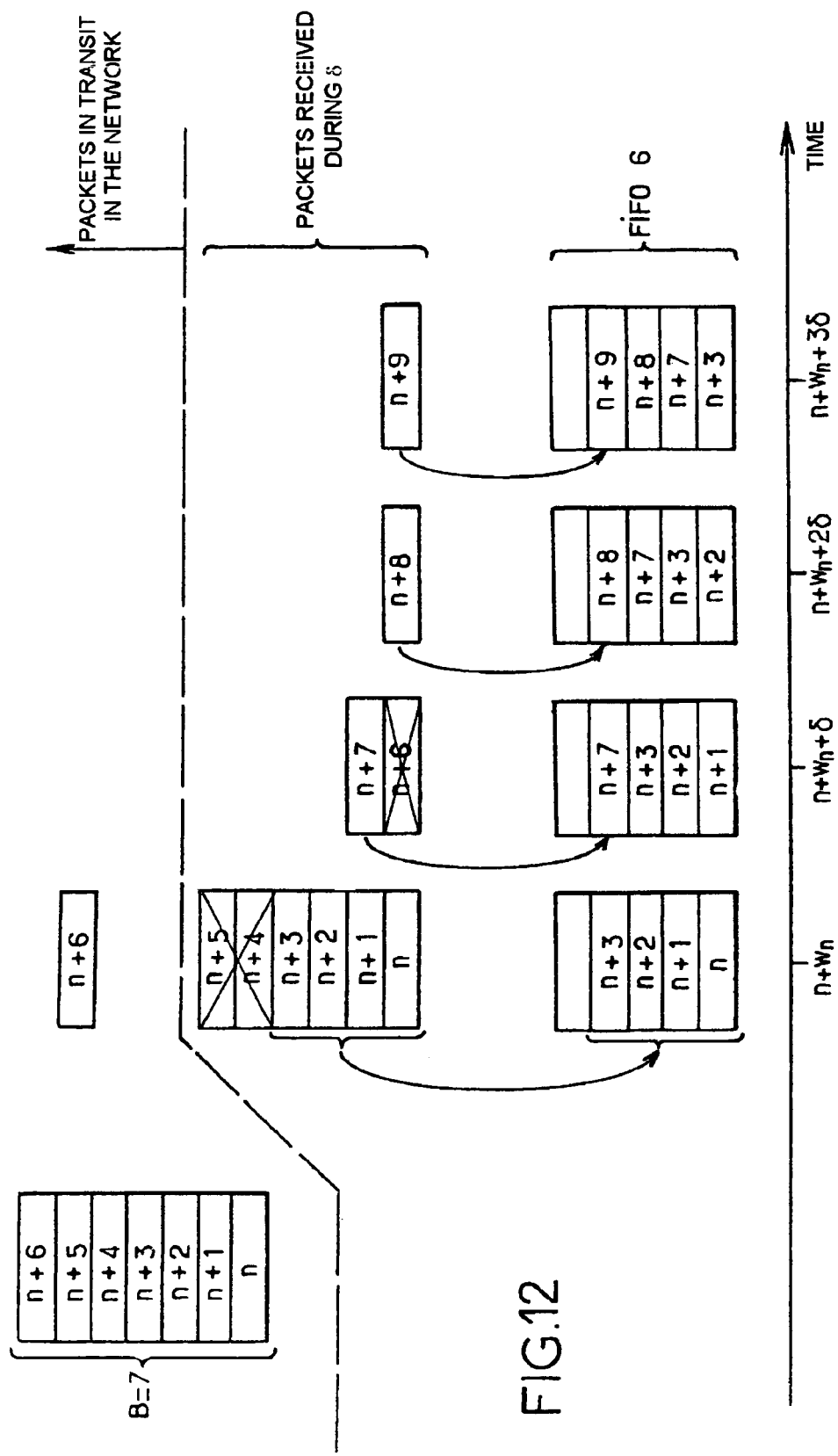

The technique of deleting the last $B-S_{FIFO}$ packets is illustrated by FIG. 12 in a case where $B=7$, $CR_\delta=6$, $S_{FIFO}=4$ and $L_{FIFO}=5$. A break in the signal of $(B-S_{FIFO}).\delta$ seconds is generally introduced, but at the end of the burst.

The techniques of total or partial deletion of examples 1 to 8 require no a priori knowledge of the content of the frames by the control module 7. These techniques are therefore advantageously usable when the computational power available to the receiver limits the complexity of the signal processing algorithms.

These techniques of total or partial deletion may be applied in a similar manner when the jitter FIFO 6 is placed before (FIGS. 2 and 4) or after the audio decoder 3 (FIG. 1). They are even applicable in the absence of an audio decoder (FIG. 3).

The choice between one of these techniques may result from a configuration of the item of equipment comprising the jitter FIFO. It may also be adapted to wishes expressed by a user and/or the changes in the behavior of the network.

When possible, it is however preferable for the control module 7 to select those packets of the burst that it is advisable to preserve, thereby avoiding irregularities due to the blunt deletion of signal or deleting packets as a function of their content.

One possible solution for selecting the packets to be preserved consists in using a VAD allowing preferential deletion of the noise frames, or at least of the frames having a greater probability than the others of containing noise. The number of signal frames deleted is chosen so as to preserve a number of useful signal frames that is less than or equal to the equivalent of $S_{FIFO}$ packets. If this is not the case, useful signal frames will also have to be deleted.

In one implementation, the VAD is carried out on the signal that arose just before the blank corresponding to the build-up of the burst in the network. If this signal is known to represent noise (silence), a start-of-burst deletion scheme is favored (example 3, 5 or 7), since it is probable that the silence extends somewhat at the start of the burst. If on the other hand speech is detected just before the burst, an end-of-burst deletion scheme (example 4, 6 or 8) is favored to have a reduced risk of cutting off the end of a sentence. The advantage of this implementation is that, the VAD being performed a posteriori, it is not necessary to carry out immediate detection as soon as the packets of the burst arrive.

If the signal coding data contain information regarding the silence/speech state, the VAD information can be extracted from the packets received without necessarily having to decode the signal. However, this is not generally the case. Access to the VAD information then requires that the computational power available be sufficient to allow at least partial decoding of the frames received before writing them to the jitter FIFO.

For the techniques of partial deletion, it is advantageous to preserve either the first frames up to a noise period (comparable to the deletion of the last $B-S_{FIFO}$ packets), or the last useful signal frames after a noise period (comparable to the deletion of the first $B-S_{FIFO}$ packets). These schemes require on the one hand that the computational power available to the receiver allow the decoding of certain at least of the frames received during a period 6, and on the other hand that it have available a VAD function and an algorithm making it possible to detect the start or the end of a sentence.

It is also possible to identify, within the frames preserved, frames regarded as noise, and to delete them so as to further reduce this number of preserved frames.

EXAMPLE 9

Figure 13:
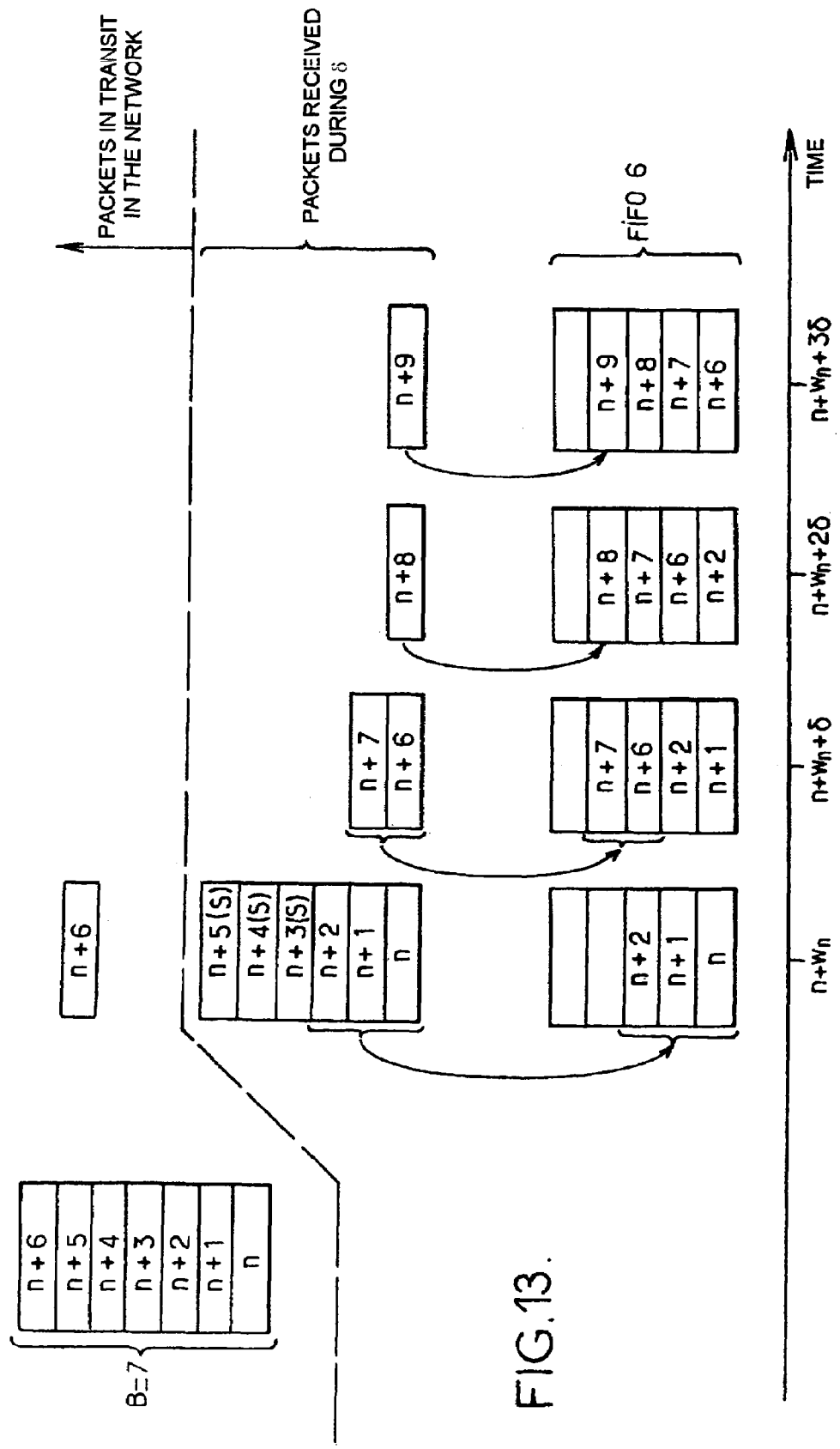

Deletion of $B-S_{FIFO}$ Packets Chosen on the Basis of a VAD Criterion, with $L_{FIFO} < CR_\delta < B$ By way of example, FIG. 13 presents a technique of partial deletion of packets as a function of their content in the particular case where the FIFO 6 is placed after the speech decoder 3, in a case where $B=7$, $CR_\delta=6$, $S_{FIFO}=4$ and $L_{FIFO}=5$. In this figure, the packets of ranks n+3, n+4 and n+5, marked with the symbol (S), contain no useful signal according to a VAD algorithm implemented in the decoder 3. It may be that the number of packets to be deleted is not sufficient, and a saturation of the FIFO may arise. It is therefore necessary to delete enough packets, if need be from those containing useful signal.

The invention claimed is:

1. A method of processing digital data packets received, containing description data for successive time segments of a signal stream to be restored, comprising the steps of:
   recording elements obtained from the packets received in a buffer memory;
   delivering elements recorded in the buffer memory in first-in first-out mode;
   detecting a priori a burst of packets fulfilling a burst size condition on the basis of a reception delay evaluated in response to the reception of a first packet of the burst; and
   controlling a content of the buffer memory by accounting for the detection of the burst fulfilling said size condition.

2. The method as claimed in claim 1, further comprising the step of evaluating a burst size upon arrival of a packet, the size condition being expressed as a threshold value with which the evaluated burst size is compared.

3. The method as claimed in claim 2, wherein the threshold is selected by taking account of a type of application and/or a type and behavior of the network.

4. The method as claimed in claim 2, wherein the evaluation of the burst size is based on parameters comprising an instant of arrival of the packets.

5. The method as claimed in claim 4, wherein the parameters on which the evaluation of the burst size is based further comprise parameters included in the packets.

6. The method as claimed in claim 5, wherein said parameters included in the packets comprise a sequence number and/or a timestamp included in packets of the RTP protocol.

7. The method as claimed in claim 1, wherein the control of the content of the buffer memory comprises taking into account a target value for the fill of the buffer memory at the end of the processing of the detected burst.

8. The method as claimed in claim 7, further comprising the step of determining the target value as a function of the fill of the buffer memory in phases where no bursts fulfilling the size condition are detected and/or as a function of the application.

9. The method as claimed in claim 1, wherein the control of the content of the buffer memory comprises taking into account a packets reception capacity by a an item of equipment incorporating the buffer memory.

10. The method as claimed in claim 9, wherein the packets reception capacity is estimated as a maximum of the numbers of packets received over a determined duration following each detection of a burst fulfilling said size condition.

11. The method as claimed in claim 1, wherein the control of the content of the buffer memory comprises deleting at least some of the elements obtained from the packets of the detected burst, before recording said elements in the buffer memory.

12. The method as claimed in claim 11, wherein all the elements obtained from the packets of the detected burst are deleted without recording them in the buffer memory.

13. The method as claimed in claim 11, wherein only part of the elements obtained from the packets of the detected burst is deleted without recording them in the buffer memory.

14. The method as claimed in claim 13, further comprising the step of evaluating a size of the burst fulfilling the size condition, wherein the deleted part represents a signal quantity corresponding substantially to the difference between a signal quantity corresponding to the evaluated burst size and a signal quantity corresponding to a target value for the fill of the buffer memory at the end of the detected burst.

15. The method as claimed in claim 13, wherein the deleted part is placed at the start of the detected burst.

16. The method as claimed in claim 13, wherein the deleted part is placed at the end of the detected burst.

17. The method as claimed in claim 13, wherein the deleted part is placed in the detected burst as a function of an activity cue of the signal to be restored.

18. The method as claimed in claim 17, wherein the activity cue of the signal to be restored is obtained in response to an at least partial decoding of the content of the packets.

19. The method as claimed in claim 13, wherein the deleted part is so placed as to prevent the buffer memory from becoming empty while the burst is processed.

20. The method as claimed in claim 19, further comprising the step of evaluating a signal quantity which could be missing on account of an empty state of the buffer memory while the burst is processed if the deleted part was placed at the start of the detected burst, and when the evaluated quantity is non zero, placing said part in the detected burst in such a way as to record in the buffer memory elements obtained from at least one packet received at the start of the detected burst and representing a signal quantity at least equal to the evaluated quantity.

21. The method as claimed in claim 1, wherein the elements recorded in the buffer memory comprise signal coding data extracted from the packets received.

22. The method as claimed in claim 1, wherein the elements recorded in the buffer memory comprise time segments of the signal stream to be restored, obtained by decoding the content of the packets received.

23. A device for receiving digital data packets representative of successive time segments of a signal to be restored, comprising a buffer memory organized in first-in first-out mode so as to receive elements obtained from the packets received, means for detecting a priori a burst of packets fulfilling a burst size condition on the basis of a reception delay evaluated in response to the reception of a first packet of the burst, and means for controlling the content of the buffer memory by accounting for the detection of the burst fulfilling said size condition.

24. The device as claimed in claim 23, further comprising means for evaluating a burst size upon arrival of a packet, the size condition being expressed as a threshold value with which the evaluated burst size is compared.

25. The device as claimed in claim 24, wherein the evaluation of the burst size is based on parameters comprising an instant of arrival of the packets.

26. The device as claimed in claim 25, wherein the parameters on which the evaluation of the burst size is based further comprise parameters included in the packets.

27. The device as claimed in claim 23, wherein the control of the content of the buffer memory comprises taking into account a target value for the fill of the buffer memory at the end of the processing of the detected burst.

28. The device as claimed in claim 23, wherein the means for controlling the content of the buffer memory comprise means for taking into account a packets reception capacity by a an item of equipment incorporating the buffer memory.

29. The device as claimed in claim 23, wherein the means for controlling the content of the buffer memory comprise means for deleting at least some of the elements obtained from the packets of the detected burst, before recording said elements in the buffer memory.

30. The device as claimed in claim 29, wherein only part of the elements obtained from the packets of the detected burst is deleted without recording them in the buffer memory.

31. The device as claimed in claim 30, further comprising means for evaluating a size of the burst fulfilling the size condition, wherein the deleted part represents a signal quantity corresponding substantially to the difference between a signal quantity corresponding to the evaluated burst size and a signal quantity corresponding to a target value for the fill of the buffer memory at the end of the detected burst.

32. The device as claimed in claim 31, wherein the deleted part is placed in the detected burst as a function of an activity cue of the signal to be restored.

* * * * *